United States Patent
Lee et al.

(10) Patent No.: US 11,847,549 B2
(45) Date of Patent: Dec. 19, 2023

(54) OPTICAL DEVICE AND OPTICAL NEURAL NETWORK APPARATUS INCLUDING THE SAME

(71) Applicant: SAMSUNG ELECTRONICS CO., LTD., Suwon-si (KR)

(72) Inventors: Duhyun Lee, Yongin-si (KR); Jaeduck Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/990,317

(22) Filed: Nov. 18, 2022

(65) Prior Publication Data

US 2023/0114551 A1 Apr. 13, 2023

Related U.S. Application Data

(62) Division of application No. 16/508,484, filed on Jul. 11, 2019.

(30) Foreign Application Priority Data

Feb. 7, 2019 (KR) .................. 10-2019-0014437

(51) Int. Cl.
*G06N 3/04* (2023.01)
*G02B 27/10* (2006.01)
(Continued)

(52) U.S. Cl.
CPC ............... *G06N 3/04* (2013.01); *G02B 26/02* (2013.01); *G02B 27/108* (2013.01); *G02B 27/283* (2013.01); *G06N 3/048* (2023.01); *G06N 3/067* (2013.01); *G06N 3/0675* (2013.01); *G06V 10/14* (2022.01); *G06V 10/141* (2022.01);
(Continued)

(58) Field of Classification Search
CPC ........... G06N 3/04; G06N 3/08; G06N 3/067; G06N 3/0675; G06V 10/141; G06V 10/14; G06V 10/147; G06V 10/145; H04N 23/73; H04N 13/0018; H04N 13/0203; G02B 26/02; G02B 27/108; G02B 27/283
See application file for complete search history.

(56) References Cited

U.S. PATENT DOCUMENTS 4,639,089 A * 1/1987 Okada ................. G02F 1/13394
445/24
4,943,556 A * 7/1990 Szu ....................... H03K 17/78
257/E39.015

(Continued)

OTHER PUBLICATIONS

Xing Lin et al., "All-optical machine learning using diffractive deep neural networks", Jul. 16, 2018, Science, pp. 1-8, (9 pages total).

*Primary Examiner* — Amir Alavi
(74) *Attorney, Agent, or Firm* — Sughrue Mion, PLLC

(57) ABSTRACT

Provided are an optical device which is capable of optically implementing an activation function of an artificial neural network and an optical neural network apparatus which includes the optical device. The optical device may include: a beam splitter splitting incident light into first light and second light; an image sensor disposed to sense the first light; an optical shutter configured to transmit or block the second light; and a controller controlling operations of the optical shutter, based on an intensity of the first light measured by the image sensor.

16 Claims, 6 Drawing Sheets

(51) Int. Cl.
  *G02B 27/28* (2006.01)
  *G02B 26/02* (2006.01)
  *G06N 3/067* (2006.01)
  *G06V 10/14* (2022.01)
  *G06V 10/141* (2022.01)
  *G06V 10/145* (2022.01)
  *G06V 10/147* (2022.01)
  *G06N 3/048* (2023.01)
  *H04N 23/73* (2023.01)

(52) U.S. Cl.
  CPC .......... *G06V 10/145* (2022.01); *G06V 10/147* (2022.01); *H04N 23/73* (2023.01)

(56) References Cited

U.S. PATENT DOCUMENTS

| | | | |
|---|---|---|---|
| 4,959,532 A * | 9/1990 | Owechko | G06N 3/067 250/201.9 |
| 4,963,725 A * | 10/1990 | Hong | G06N 3/067 359/107 |
| 5,095,459 A | 3/1992 | Ohta et al. | |
| 5,099,434 A * | 3/1992 | Stoll | G06N 3/067 708/191 |
| 5,167,007 A | 11/1992 | Toyoda | |
| 5,428,711 A | 6/1995 | Akiyama et al. | |
| 5,640,261 A * | 6/1997 | Ono | G06E 3/005 359/107 |
| 5,644,681 A | 7/1997 | Takahashi et al. | |
| 5,699,449 A | 12/1997 | Javidi | |
| 5,704,015 A | 12/1997 | Ono | |
| 5,739,943 A | 4/1998 | Ohshima et al. | |
| 6,157,488 A | 12/2000 | Ishii | |
| 6,754,646 B1 * | 6/2004 | Wang | G06N 3/063 706/40 |
| 7,515,753 B2 * | 4/2009 | Goldenberg | G02B 27/46 382/191 |
| 10,007,234 B2 | 6/2018 | Lee et al. | |
| 10,310,261 B2 | 6/2019 | Christmas et al. | |
| 10,395,168 B2 * | 8/2019 | Abel | G06N 3/044 |
| 11,526,743 B2 * | 12/2022 | Liu | G06N 3/08 |
| 2010/0135342 A1 | 6/2010 | Livas et al. | |
| 2012/0242924 A1 * | 9/2012 | Galstian | G02F 1/133512 349/54 |
| 2014/0340724 A1 | 11/2014 | Won et al. | |
| 2014/0347445 A1 * | 11/2014 | Yoon | G01S 7/481 348/46 |
| 2017/0351293 A1 | 12/2017 | Carolan et al. | |
| 2019/0318234 A1 | 10/2019 | Abel et al. | |
| 2020/0257958 A1 | 8/2020 | Lee et al. | |
| 2020/0327403 A1 | 10/2020 | Du et al. | |

\* cited by examiner

OPTICAL DEVICE AND OPTICAL NEURAL NETWORK APPARATUS INCLUDING THE SAME

This application is a Divisional of U.S. application Ser. No. 16/508,484, filed on Jul. 11, 2019, which is based on and claims priority under 35 U.S.C. § 119 to Korean Patent Application No. 10-2019-0014437, filed on Feb. 7, 2019, in the Korean Intellectual Property Office, the disclosures of which are incorporated herein in their entireties by reference.

BACKGROUND

1. Field

The disclosure relates to an optical device and an optical neural network apparatus including the optical device, and more particularly, to an optical device which is capable of optically implementing an activation function of an artificial neural network and an optical neural network apparatus which includes the optical device and that optically implements the artificial neural network.

2. Description of Related Art

An artificial neural network is a machine learning method of processing data in a manner similar to that of a human brain. As significant developments in computer performance have enabled learning through big data, great achievements have recently been made in artificial neural network technology.

An artificial neural network includes an input layer, a hidden layer, and an output layer, and each layer includes a plurality of nodes as a data processing unit. A weight is given to data transferred from nodes in the input layer to nodes in the hidden layer, and a weight is also given to data transferred from the nodes in the hidden layer to nodes in the output layer. Learning is performed by adjusting weights of a plurality of nodes based on errors in an output layer to eventually reduce the errors in the output layer. An artificial neural network may include only one hidden layer but may also include a plurality of hidden layers. An artificial neural network having a plurality of hidden layers is usually referred to as a deep neural network, and learning by using a deep neural network is referred to as deep learning.

An artificial neural network may be implemented as software or as a dedicated electronic circuit. An artificial neural network implemented as software may have a slow speed due to a large amount of calculation. When an artificial neural network is implemented as a dedicated electronic circuit, wirings for connecting nodes in neighboring layers may be disposed in a complex manner.

SUMMARY

In accordance with an aspect of the disclosure, an optical device includes a beam splitter configured to split an incident light into a first light and a second light; an image sensor positioned to sense the first light; an optical shutter configured to transmit or block the second light; and a controller configured to control the optical shutter based on an intensity of the first light measured by the image sensor.

The first light may be reflected by the beam splitter and the second light may be transmitted by the beam splitter.

The image sensor may include a plurality of light-sensing pixels that are two-dimensionally arranged, the optical shutter may include a plurality of pixels that are two-dimensionally arranged, and a resolution of the image sensor may be identical to a resolution of the optical shutter such that there is a one-to-one correspondence between the plurality of light-sensing pixels of the image sensor and the plurality of pixels of the optical shutter.

The controller may be configured to, when an output of a light-sensing pixel from among the plurality of light-sensing pixels of the image sensor is less than a reference value, turn off a pixel from among the plurality of pixels of the optical shutter corresponding to the light-sensing pixel of the image sensor; and when the output of the light-sensing pixel from among the plurality of light-sensing pixels of the image sensor is equal to or greater than a reference value, turn on the pixel of the optical shutter corresponding to the light-sensing pixel of the image sensor.

The controller may be configured to block the second light by turning off the optical shutter when an intensity of the first light incident on the image sensor is less than a reference value and transmit the second light by turning on the optical shutter when an intensity of the first light incident on the image sensor is equal to or greater than the reference value.

The optical shutter may include a bistable liquid crystal.

In accordance with an aspect of the disclosure, an optical device includes a beam splitter configured to split an incident light into a first light and a second light; a reference light source configured to emit a reference light; a phase comparator configured to compare a phase of the reference light to a phase of the first light; an optical shutter configured to transmit or block the second light; and a controller configured to control the optical shutter based on a result of comparing the phase of the reference light to the phase of the first light performed by the phase comparator.

The reference light source may include a laser configured to emit coherent light that has a wavelength identical to a wavelength of the incident light.

The phase comparator may be positioned facing a reflecting surface of the beam splitter, the optical shutter may be positioned facing a transmission surface of the beam splitter, and the reference light source may be positioned facing the phase comparator with the beam splitter positioned between the phase comparator and the reference light source.

The incident light may be linearly polarized in a first direction and the reference light may be linearly polarized in a second direction orthogonal to the first direction.

The phase comparator may include a polarization beam combiner configured to combine the reference light with the first light and guide the combined light; a polarizer layer including a first polarizer configured to transmit light that has a polarization direction tilted by −45 degrees with respect to the second direction and a second polarizer configured to transmit light that has a polarization direction tilted by +45 degrees with respect to the second direction; an image sensor layer including a first light-sensing pixel configured to sense an intensity of the light transmitted through the first polarizer; and a second light-sensing pixel configured to sense an intensity of the light transmitted through the second polarizer; and a comparison layer including a comparator configured to compare an output of the first light-sensing pixel to an output of the second light-sensing pixel.

The optical shutter may include a plurality of pixels that are two-dimensionally arranged, the polarizer layer may include a plurality of polarizing pixels that are two-dimensionally arranged, the plurality of polarizing pixels each including the first polarizer and the second polarizer, the comparison layer may include a plurality of comparators that are two-dimensionally arranged, and a resolution of the polarizer layer, a resolution of the comparison layer, and a resolution of the optical shutter may be identical to one another such that there is a one-to-one correspondence among the plurality of polarizing pixels of the polarizer layer, the plurality of comparators of the comparison layer, and the plurality of pixels of the optical shutter.

The image sensor layer may include a plurality of the first light-sensing pixels that are two-dimensionally arranged and a plurality of the second light-sensing pixels that are two-dimensionally arranged, and a resolution of the image sensor layer may be twice the resolution of the optical shutter.

The controller may be configured to, when the output of the second light-sensing pixel is equal to or greater than the output of the first light-sensing pixel, turn on a pixel from among the plurality of pixels of the optical shutter corresponding to the comparator of the comparison layer; and when the output of the second light-sensing pixel is less than the output of the first light-sensing pixel, turn off the pixel from among the plurality of pixels of the optical shutter corresponding to the comparator of the comparison layer.

The controller may be configured to transmit the second light by turning on the optical shutter when a phase difference between the reference light and the first light is within a range from −90 degrees to +90 degrees; and block the second light by turning off the optical shutter when the phase difference between the reference light and the first light is outside of the range from −90 degrees to +90 degrees.

The optical shutter may include a bistable liquid crystal.

In accordance with an aspect of the disclosure, an optical neural network apparatus includes an input layer including a first phase modulator configured to modulate a phase of an incident light according to an incident position of the incident light on a two-dimensional plane of the first phase modulator and output a first modulated light based on modulating the phase of the incident light; a hidden layer including a second phase modulator configured to receive the first modulated light and modulate the phase of the first modulated light according to an incident position of the first modulated light on a two-dimensional plane of the second phase modulator and output a second modulated light based on modulating the phase of the first modulated light; an optical device configured to receive the second modulated light and partially transmit or block the second modulated light according to an intensity or a phase of the second modulated light; and an output layer including a first image sensor.

The optical device may include a beam splitter configured to split the second modulated light into a first output light and a second output light; a second image sensor including a plurality of light-sensing pixels that are two-dimensionally arranged to sense the first output light; an optical shutter including a plurality of pixels that are two-dimensionally arranged and configured to transmit or block the second output light; and a controller configured to control the optical shutter based on an intensity of the first output light measured by the second image sensor.

The second phase modulator may include a plurality of pixels that are two-dimensionally arranged, and a resolution of the second image sensor of the optical device, a resolution of the optical shutter of the optical device, and a resolution of the second phase modulator may be identical to one another such that there is a one-to-one correspondence among the plurality of light-sensing pixels of the second image sensor of the optical device, the plurality of pixels of the optical shutter, and the plurality of pixels of the second phase modulator.

The optical device may include a beam splitter configured to split an incident light into a first light and a second light; a reference light source configured to emit a reference light; a phase comparator configured to compare a phase of the reference light to a phase of the first light; an optical shutter configured to transmit or block the second light; and a controller configured to control the optical shutter based on a result of the comparing of the phase of the reference light to the phase of the first light.

The phase comparator may include a polarization beam combiner configured to combine the reference light with the first light and guide the combined light; a polarizer layer including a plurality of polarizing pixels that are two-dimensionally arranged; an image sensor layer including a plurality of light-sensing pixels that are two-dimensionally arranged; and a comparison layer including a plurality of comparators that are two-dimensionally arranged.

The second phase modulator may include a plurality of pixels that are two-dimensionally arranged, a resolution of the polarizer layer, a resolution of the comparison layer, a resolution of the optical shutter, and a resolution of the second phase modulator may be identical to one another such that there is a one-to-one correspondence among the plurality of polarizing pixels of the polarizer layer, the plurality of comparators in the comparison layer, the plurality of pixels of the optical shutter, and the plurality of pixels of the second phase modulator, and a resolution of the image sensor layer may be twice the resolution of the second phase modulator.

The incident light may be linearly polarized in a first direction and the reference light may be linearly polarized in a second direction orthogonal to the first direction, each polarizing pixel from among the plurality of polarizing pixels of the polarizer layer may include a first polarizer configured to transmit light that has a polarization direction tilted by −45 degrees with respect to the second direction and a second polarizer configured to transmit light that has a polarization direction tilted by +45 degrees with respect to the second direction, the image sensor layer may include a first light-sensing pixel from among the plurality of light-sensing pixels, the first light-sensing pixel being configured to sense an intensity of the light transmitted through the first polarizer; and a second light-sensing pixel from among the plurality of light-sensing pixels, the second light-sensing pixel being configured to sense an intensity of the light transmitted through the second polarizer, and each comparator from among the plurality of comparators may be configured to compare an output of a corresponding first light-sensing pixel to an output of a corresponding second light-sensing pixel.

The controller may be configured to, when an output of the second light-sensing pixel is equal to or greater than an output of the first light-sensing pixel, turn on a pixel from among the plurality of pixels of the optical shutter corresponding to a comparator from among the plurality of comparators of the comparison layer that corresponds to the first light-sensing pixel and the second light-sensing pixel; and when the output of the second light-sensing pixel is less than the output of the first light-sensing pixel, turn off the pixel from among the plurality of pixels of the optical shutter corresponding to the comparator.

Light emitted from a pixel from among the plurality of pixels of the second phase modulator corresponding to the pixel of the optical shutter may be blocked when the pixel of the optical shutter is turned off, and the light emitted from the pixel from among the plurality of pixels of the second phase modulator corresponding to the pixel of the optical shutter may be transmitted through the optical shutter when the pixel of the optical shutter is turned on.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
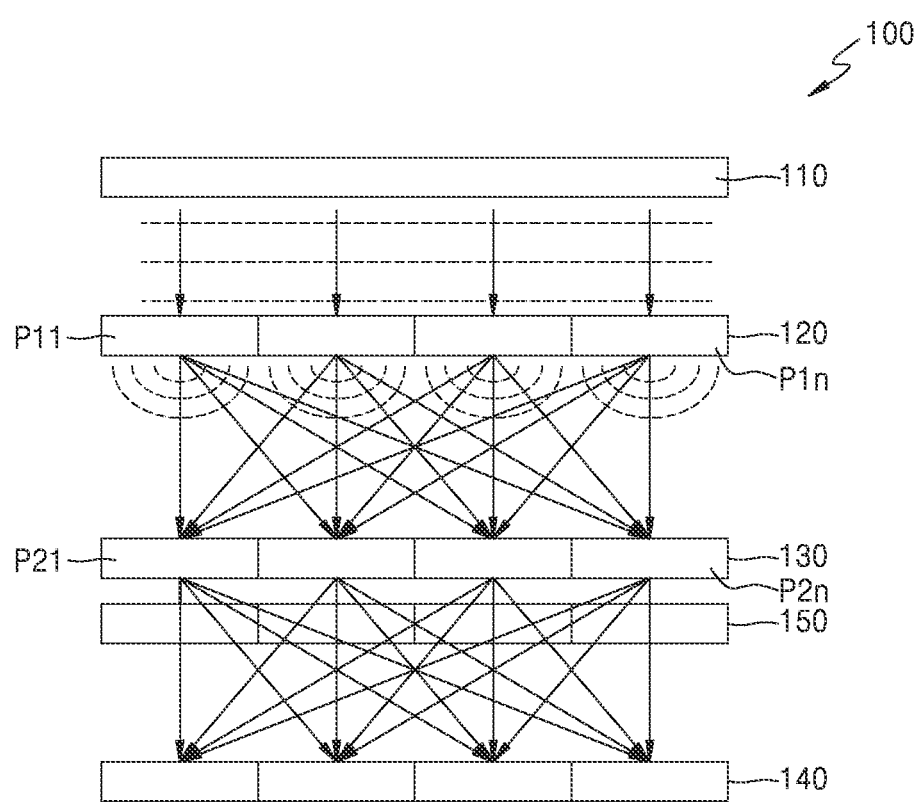
FIG. 1 is a conceptual diagram showing a schematic configuration of an optical neural network apparatus.

Hereinafter, an optical device and an optical neural network apparatus including the optical device will be described in detail with reference to the attached drawings. In the attached drawings, same reference numerals refer to same elements and sizes of elements in the drawings may be exaggerated for clarity and convenience of description. Embodiments described hereinafter are used in an illustrative sense only and the embodiments may be variously modified. In addition, in a layer structure described hereinafter, expressions such as "above" and "on" may include not only elements on/under/left/right in direct contact but also elements above/under/left/right without direct contact.

FIG. 1 is a conceptual diagram showing a schematic configuration of an optical neural network apparatus 100. Referring to FIG. 1, the optical neural network apparatus 100 according to an embodiment may include a first phase modulator 120, a second phase modulator 130, an optical device 150, and an image sensor 140. In addition, the optical neural network apparatus 100 may further include a light source 110 which provides coherent light. However, the optical neural network apparatus 100 is not necessarily combined to the light source 110 in a fixed manner and may be manufactured, distributed, and sold independently from the light source 110.

The first phase modulator 120 and the second phase modulator 130 may be spatial light modulators configured to actively modulate a phase of incident light by using electrical control. For example, the first phase modulator 120 and the second phase modulator 130 may be liquid crystal modulators using liquid crystal or semiconductor-based spatial light modulators. In addition, the first phase modulator 120 and the second phase modulator 130 may be transmissive spatial light modulators that modulate and transmit incident light. The first phase modulator 120 and the second phase modulator 130 each include a plurality of pixels that are two-dimensionally arranged, wherein each of the pixels may be independently driven to modulate a phase of light incident on the pixel. Therefore, the first phase modulator 120 and the second phase modulator 130 may locally modulate a phase of the incident light according to an incident position of the incident light on respective two-dimensional planes of the first phase modulator 120 and the second phase modulator 130.

The first phase modulator 120 that is disposed in the front in a direction of light propagation (i.e., light from the light source 110 is incident on the first phase modulator 120 before being transmitted to the second phase modulator 130) may function as an input layer of the optical neural network apparatus 100. Accordingly, light emitted from the light source 110 is first incident on the first phase modulator 120. Light that is incident on each of the pixels P11 to P1n of the first phase modulator 120 may all have the same phase. The first phase modulator 120 may variously modulate the phase of the incident light that is incident from the light source 110, according to the incident position on the two-dimensional plane of the first phase modulator 120.

Figure 2:
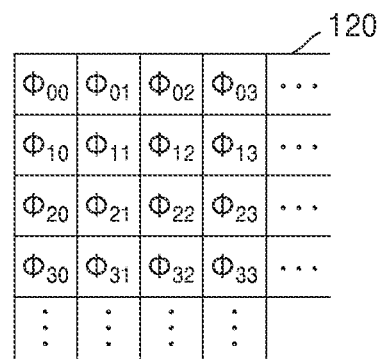
FIG. 2 shows an example of phase modulation by using a plurality of pixels in each phase modulator of the optical neural network apparatus shown in FIG. 1.

For example, FIG. 2 shows phase modulation performed by the plurality of pixels of the first phase modulator 120 in the optical neural network apparatus 100 shown in FIG. 1. Referring to FIG. 2, pixels in a first pixel row of the first phase modulator 120 may, from left to right, transmit the incident light with a phase delay of $\varphi_{00}$, $\varphi_{01}$, $\varphi_{02}$, $\varphi_{03}$, and so on. In addition, pixels in a second pixel row of the first phase modulator 120 may, from left to right, transmit the incident light with a phase delay of $\varphi_{10}$, $\varphi_{11}$, $\varphi_{12}$, $\varphi_{13}$, and so on, pixels in a third row may, from left to right, transmit the incident light with a phase delay of $\varphi_{20}$, $\varphi_{21}$, $\varphi_{22}$, $\varphi_{23}$, and so on, and pixels in a fourth row may, from left to right, transmit the incident light with a phase delay of $\varphi_{30}$, $\varphi_{31}$, $\varphi_{32}$, $\varphi_{33}$, and so on. In each pixel, a degree of phase delay may be electrically controlled. According to the present embodiment, each pixel of the first phase modulator 120 functions as a node of the input layer of the optical neural network apparatus 100. In addition, controlling phase delay in each pixel is equivalent to adjusting a weight in each node of the optical neural network apparatus 100. In other words, the weight of each node of the input layer is determined by the phase delay of each pixel, which is adjusted by modulating a phase of the incident light in the plurality of pixels of the first phase modulator 120.

The light which is phase-modulated by the input layer, that is, the pixels P11 through P1n of the first phase modulator 120, is incident on the second phase modulator 130. The second phase modulator 130 may function as a hidden layer of the optical neural network apparatus 100. FIG. 1 shows a case in which the number of hidden layers is only one, but the number of hidden layers may be variously selected to be at least one as needed.

Light emitted from each of the pixels P11 through P1n of the first phase modulator 120 may be incident on all of pixels P21 through P2n of the second phase modulator 130. For example, light emitted from a 1-1 pixel P11 in the first phase modulator 120 may be incident on all of the pixels P21 through P2n of the second phase modulator 130, and light emitted from a 1-n pixel P1n of the first phase modulator 120 may also be incident on all of the pixels P21 through P2n in the second phase modulator 130. Light from multiple pixels P11 through P1n with different phase delays is therefore incident on each pixel of the second phase modulator 130. Thus, an interference pattern may be formed on a surface of the second phase modulator 130.

The second phase modulator 130 may locally modulate a phase of the incident light having the interference pattern. In other words, each of the pixels P21 through P2n in the second phase modulator 130 may independently delay the phase of the incident light, in a manner similar to the pixels P11 through P1n of the first phase modulator 120. Phase modulation performed by the second phase modulator 130 may be different from phase modulation performed by the first phase modulator 120. In other words, the first phase modulator 120 and the second phase modulator 130 may have two-dimensional phase modulation patterns that are different from each other.

The light that is phase-modulated by the second phase modulator 130 reaches the image sensor 140 via the optical device 150. The optical device 150 partially transmits or blocks the light emitted from each pixel in the second phase modulator 130, according to an intensity of the emitted light. Accordingly, the optical device 150 may function as an activation function of an artificial neural network. Particularly, the optical device 150 may have a function similar to that of Rectified Linear Unit (ReLu) function among activation functions. For example, when an intensity of light emitted from any one pixel of the second phase modulator 130 is less than a reference value, the optical device 150 may entirely block the light emitted from the pixel, and when the intensity of the light is equal to or greater than the reference value, the optical device 150 may entirely transmit the light emitted from the pixel. In this case, from among the interference pattern that is formed on the surface of the optical device 150 due to the light emitted from the second phase modulator 130, a relatively darker portion is blocked by the optical device 150, and only a relatively brighter portion having an intensity of light that is equal to or greater than the reference value may be transmitted through the optical device 150.

The relatively brighter portion of the light having the intensity equal to or greater than the reference value, which is transmitted through the optical device 150, may be incident on the image sensor 140. As the lights phase-modulated by the second phase modulator 130 and transmitted by the optical device 150 interfere with one another on the surface of the image sensor 140, an interference pattern may be formed on a surface of the image sensor 140. The image sensor 140 may include a plurality of light-sensing pixels that are two-dimensionally arranged and that detect the interference pattern by using the plurality of light-sensing pixels. In addition, a result of inference by using the optical neural network apparatus 100 may be identified by analyzing an output of the image sensor 140. In that sense, the image sensor 140 may be understood to function as an output layer of the optical neural network apparatus 100. Each pixel in the image sensor 140 may function as a node in the output layer. Alternatively, the image sensor 140 may be divided into a plurality of areas each including multiple pixels, and each of the areas may function as a node in the output layer.

According to the above-mentioned embodiment, the first phase modulator 120 and the second phase modulator 130 each constitute a layer in the artificial neural network in which the first phase modulator 120 and the second phase modulator 130 modulate the phase of the incident light according to an assigned weight, and therefore, the optical neural network apparatus 100 may function as the artificial neural network. Accordingly, the optical neural network apparatus 100 may perform its operations as the light is being transmitted through the first phase modulator 120 and the second phase modulator 130. Thus, operations using a processor are not required, and a speed of the artificial neural network may be significantly increased.

Furthermore, according to an embodiment, data is processed in a way in which the light that is phase-modulated in the first phase modulator 120 is incident on the second phase modulator 130, and therefore, physical wirings are not required for connecting nodes in neighboring layers. Accordingly, the artificial neural network may be embodied in a simple structure.

In addition, the optical device 150 may be positioned between the second phase modulator 130 and the image sensor 140 of the optical neural network apparatus 100 and may apply an activation function to the light emitted from the second phase modulator 130, and selectively transmit the light to the image sensor 140. Therefore, as an activation function facility may be provided to the optical neural network apparatus 100 through the optical device 150, performance of the optical neural network apparatus 100 may be further enhanced.

Figure 3:
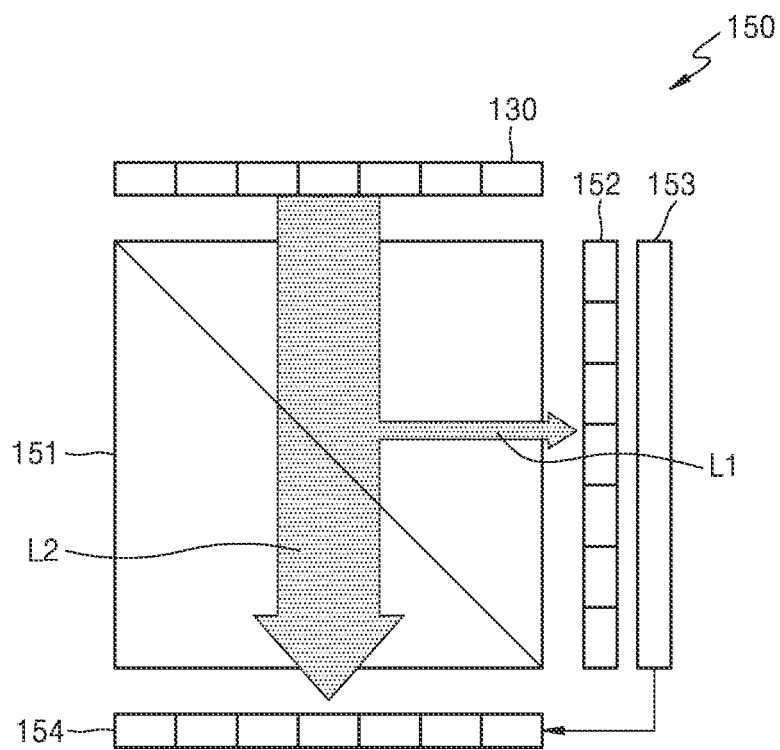
FIG. 3 is a conceptual diagram showing a configuration of an optical device for providing an activation function facility according to an embodiment.

FIG. 3 is a conceptual diagram showing a schematic configuration of the optical device 150 for providing the activation function facility. Referring to FIG. 3, the optical device 150 may include a beam splitter 151 splitting incident light into a first light L1 and a second light L2, an image sensor 152 detecting the first light L1, an optical shutter 154 configured to transmit or block the second light L2, and a controller 153 controlling operations of the optical shutter 154 based on an intensity of the first light L1 measured by the image sensor 152.

The beam splitter 151 may reflect a first portion of the incident light and transmit a second portion of the incident light. For example, the beam splitter 151 may transmit from about 90% to about 95% of the incident light and reflect from about 5% to about 10% of the incident light. Accordingly, most of the incident light is incident on the optical shutter 154 as the second light L2 and only small portion of the incident light is incident on the image sensor 152 as the first light L1. In the example shown in FIG. 1, the beam splitter 151 may be disposed to face a light-emitting surface of the second phase modulator 130.

The image sensor 152 may be disposed to face a reflecting surface of the beam splitter 151. The image sensor 152 may include a plurality of light-sensing pixels that are two-dimensionally arranged. To measure the intensity of the light emitted from each of the pixels of the second phase modulator 130, the image sensor 152 may have a resolution identical to that of the second phase modulator 130. For example, when the second phase modulator 130 has a resolution of 200×100, the image sensor 152 may also have a resolution of 200×100. In other words, there may be a one-to-one correspondence between the pixels of the second phase modulator 130 and the light-sensing pixels of the image sensor 152. Therefore, the first portion of the light emitted from a pixel of the second phase modulator 130 may be reflected by the beam splitter 151 and be incident on the light-sensing pixel in the image sensor 152 corresponding to the pixel of the second phase modulator 130. Accordingly, the intensity of the light emitted from each of the pixels of the second phase modulator 130 may be sensed based on an output of each light-sensing pixel of the image sensor 152.

The optical shutter 154 may be disposed to face a transmission surface of the beam splitter 151. Furthermore, in the example shown in FIG. 1, the optical shutter 154 may be disposed to face the incident surface of the image sensor 140 of the optical neural network apparatus 100. In addition, the optical shutter 154 may be disposed to face the second phase modulator 130 with the beam splitter 151 positioned therebetween. To separately transmit or block the light emitted from each pixel of the second phase modulator 130, the optical shutter 154 may have a resolution identical to a resolution of the second phase modulator 130. For example, when the second phase modulator 130 has the resolution of 200×100, the optical shutter 154 may also have a resolution of 200×100. In other words, there may be a one-to-one correspondence between the pixels of the second phase modulator 130 and the pixels of the optical shutter 154. Then, the second portion of light emitted from any one pixel of the second phase modulator 130 may be transmitted through the beam splitter 151 and be incident on a pixel of the optical shutter 154 corresponding to the pixel of the second phase modulator 130. Therefore, the second phase modulator 130, the image sensor 152, and the optical shutter 154 have identical resolutions and pixels corresponding to one another. The pixels in the optical shutter 154 may, for example, include a bistable liquid crystal.

The controller 153 may control each pixel in the optical shutter 154, based on an output of each light-sensing pixel in the image sensor 152. The controller 153 may include software, an electronic circuit, or a dedicated semiconductor chip. For example, when an output of a light-sensing pixel in the image sensor 152 is less than a reference value, the controller 153 turns off a pixel of the optical shutter 154 corresponding to the light-sensing pixel. By doing so, light emitted from a pixel of the second phase modulator 130 corresponding to the light-sensing pixel is blocked by the optical shutter 154. In addition, when an output of a light-sensing pixel in the image sensor 152 is equal to or greater than the reference value, the controller 153 turns on a pixel of the optical shutter 154 corresponding to the light-sensing pixel. By doing so, light emitted from a pixel of the second phase modulator 130 corresponding to the light-sensing pixel may be transmitted through the optical shutter 154.

Figure 4:
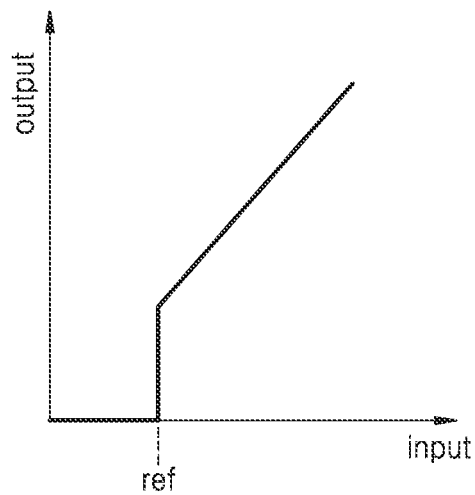
FIG. 4 is a graph showing operation characteristics of the optical device shown in FIG. 3.

According to the above-mentioned method, the optical device 150 may optically implement an activation function that is similar to a rectified linear unit (ReLu) function of the artificial neural network embodied in software or an electronic circuit. For example, FIG. 4 is a graph showing operational characteristics of the optical device 150 shown in FIG. 3. Referring to FIG. 4, when an intensity of light input to the optical device 150 is less than a reference value ref, an output of the optical device 150 is 0. When an intensity of light input to the optical device 150 is equal to or greater than the reference value ref, the optical device 150 may output a value equal to the intensity of the light input to the optical device 150. In other words, when an intensity of the light incident on the optical device 150 is lower than the reference value ref, the optical device 150 may entirely block the light, and when the intensity of the light incident on the optical device is equal to or greater than the reference value ref, the optical device 150 may entirely transmit the light such that the output intensity is proportional to the input intensity.

Figure 5:
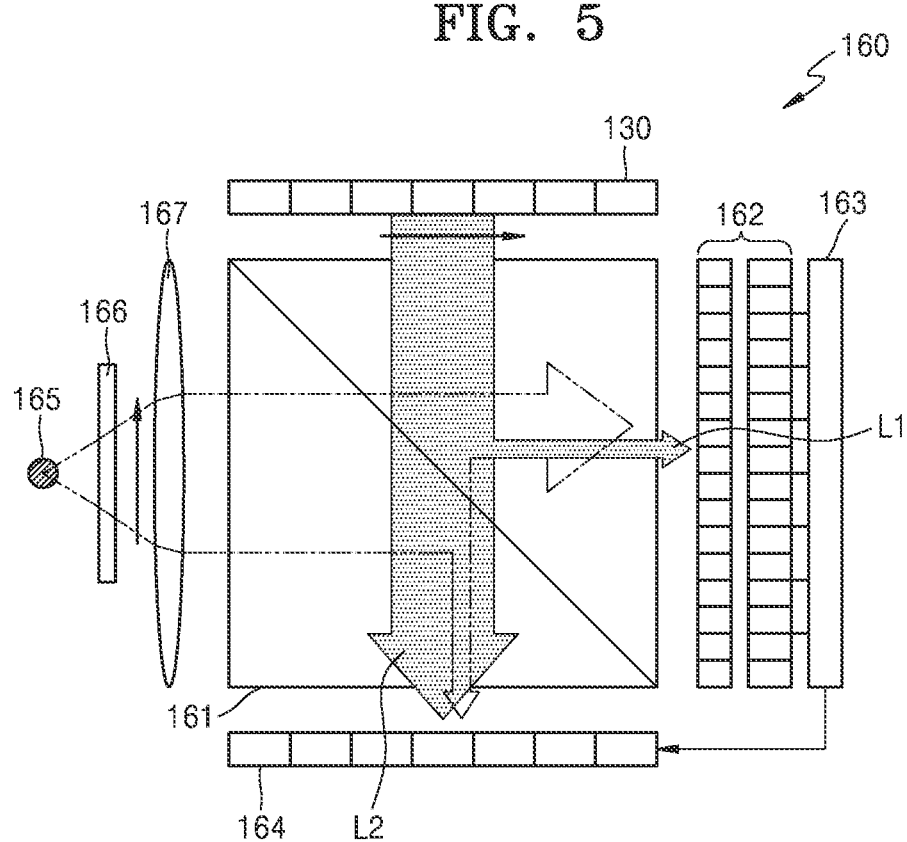
FIG. 5 is a conceptual diagram showing a schematic configuration of an optical device for providing an activation function facility, according to an embodiment.

The optical device 150 operates based on the intensity of the incident light but may also operate based on the phase of the incident light. For example, FIG. 5 is a conceptual diagram showing a schematic configuration of an optical device 160 for providing the activation function facility, according to an embodiment. Referring to FIG. 5, the optical device 160 according to an embodiment may include a beam splitter 161 transmitting and reflecting incident light (referred to as "target light" hereinafter) that is incident from an external phase modulator and splitting the target light into first light L1 and second light L2, a reference light source 165 providing reference light, a phase comparator 162 for comparing a phase of the reference light to a phase of the first light L1, an optical shutter 164 configured to transmit or block the second light L2, and a controller 163 controlling operations of the optical shutter 164, based on a result of comparing the phase of the reference light to the phase of the first light L1 by using the phase comparator 162.

The beam splitter 161 may reflect a first portion of the target light that is incident on the beam splitter 161 and transmit a second portion of the target light. For example, the beam splitter 161 may transmit from about 90% to about 95% of the target light and reflect from about 5% to about 10% of the target light. Accordingly, most of the target light is incident on the optical shutter 164 as the second light L2 and only a small portion of the target light is incident on the phase comparator 162 as the first light L1. In the example shown in FIG. 1, the beam splitter 161 may be disposed to face the light-emitting surface of the second phase modulator 130. In this case, the target light is light emitted from the second phase modulator 130.

The optical shutter 164 may be disposed to face a transmission surface of the beam splitter 161. In the example shown in FIG. 1, the optical shutter 164 may also be disposed to face the incident surface of the image sensor 140 in the optical neural network apparatus 100. To separately transmit or block the light emitted from each pixel of the second phase modulator 130, the optical shutter 164 may have a resolution identical to a resolution of the second phase modulator 130. Therefore, the second portion of light emitted from any one pixel of the second phase modulator 130 may be transmitted through the beam splitter 161 and be incident on a pixel of the optical shutter 164 corresponding to the pixel of the second phase modulator 130. The pixels in the optical shutter 164 may, for example, include a bistable liquid crystal.

A reference light source 165 emits reference light providing a reference for determining a phase of the target light. To this end, the reference light source 165 may be a laser emitting phase matched coherent light. In addition, the reference light source 165 emits the reference light which has a wavelength that is identical to a wavelength of the target light. The reference light source 165 may be, for example, disposed to face the phase comparator 162 with the beam splitter 161 positioned therebetween. Most of the reference light emitted from the reference light source 165 is transmitted through the beam splitter 161 and is incident on the phase comparator 162, and only small portion of the reference light is reflected by the beam splitter 161.

When the second phase modulator 130 is a liquid crystal modulator, the target light is linearly polarized in a certain direction. The reference light has a linear polarization component that is orthogonal to a linear polarization component of the target light. To this end, the reference light source 165 may be a polarization laser emitting the reference light that is linearly polarized in a direction orthogonal to that of the linear polarization component of the target light. When the reference light source 165 emits a non-polarized reference light, a polarizer 166 may be further disposed between the reference light source 165 and the beam splitter 161. The polarizer 166 only transmits the reference light having the linear polarization component that is orthogonal to the linear polarization component of the target light. In other words, the target light may be linearly polarized in a first direction and the reference light may be linearly polarized in a second direction orthogonal to the first direction. In addition, a collimating lens 167 which changes the reference light into parallel light may be further disposed between the reference light source 165 and the beam splitter 161. Meanwhile, when the second phase modulator 130 is not a liquid crystal modulator, a polarizer may be further disposed at an incidence surface of the beam splitter 161. The polarizer at the incidence surface of the beam splitter 161 may have a polarization property orthogonal to the polarizer 166 disposed between the reference light source 165 and the beam splitter 161.

The phase comparator 162 may be disposed to face the reflecting surface of the beam splitter 161. Therefore, the reference light transmitted through the beam splitter 161 and the first light L1, that is, the target light reflected by the beam splitter 161, may both be incident on the phase comparator 162. The phase comparator 162 is configured to compare a phase of the first light L1 of the target light to a phase of the reference light, wherein the first light L1 and the reference light have polarization components orthogonal to each other. For example, FIG. 6 shows an example of a more detailed configuration of the phase comparator 162 of the optical device 160 shown in FIG. 5.

Figure 6:
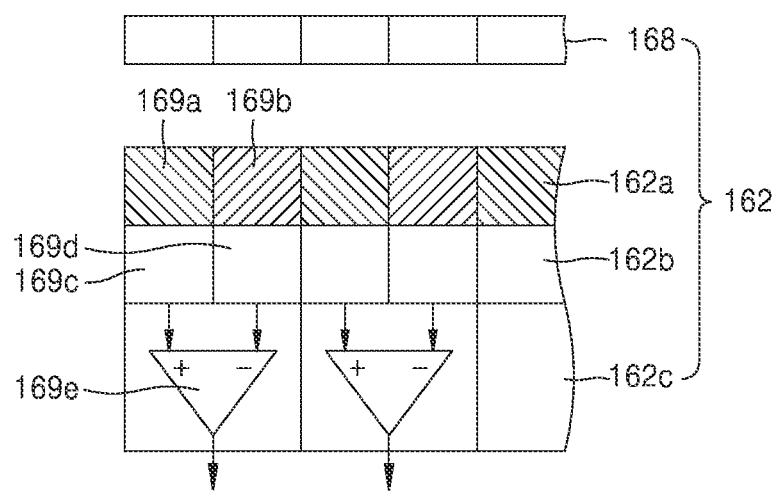
FIG. 6 shows an example of a more detailed configuration of a phase comparator in the optical device shown in FIG. 5.

Referring to FIG. 6, the phase comparator 162 according to an embodiment may include a polarization beam combiner 168, a polarizer layer 162a, an image sensor layer 162b, and a comparison layer 162c. The polarization beam combiner 168 is an optical element for guiding the target light and the reference light to each pixel of the polarizer layer 162a along a same light path. The target light and the reference light, which have polarized components orthogonal to each other, may be combined to each other and be incident on each pixel of the polarizer layer 162a while being guided by the polarization beam combiner 168. For example, the polarization beam combiner 168 may be formed by combining two sheets of prisms including a birefringent material. Alternatively, various kinds of polarization beam combiners may be used. When a light path of the target light is precisely identical to a light path of the reference light, the polarization beam combiner 168 is not necessarily used.

The polarizer layer 162a may include a plurality of polarizing pixels that are two-dimensionally arranged. To determine a phase of the target light emitted from each pixel of the second phase modulator 130, the polarizer layer 162a may have a resolution identical to that of the second phase modulator 130. For example, when the second phase modulator 130 has a resolution of 200×100, the polarizer layer 162a may also have a resolution of 200×100. In other words, there may be a one-to-one correspondence between the pixels of the second phase modulator 130 and the polarizing pixels of the polarizer layer 162.

In addition, each of the polarizing pixels of the polarizer layer 162a may include a first polarizer 169a and a second polarizer 169b positioned adjacent to each other as shown in FIG. 6. For example, the first polarizer 169a may be configured to transmit light having a polarization direction tilted by −45 degrees with reference to a polarization direction of the reference light, and the second polarizer 169b may be configured to transmit light having a polarization direction tilted by +45 degrees with reference to the polarization direction of the reference light. Alternatively, the first polarizer 169a may be configured to transmit light having a polarization direction tilted by −45 degrees with reference to a polarization direction of the target light, and the second polarizer 169b may be configured to transmit light having a polarization direction tilted by +45 degrees with reference to the polarization direction of the target light.

Figure 7:
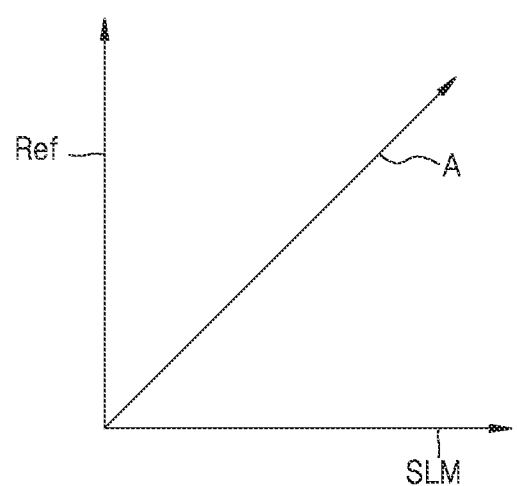
FIG. 7 shows an example of a polarization direction of combined light when a phase of target light emitted from a phase modulator is identical to a phase of reference light.
Figure 8:
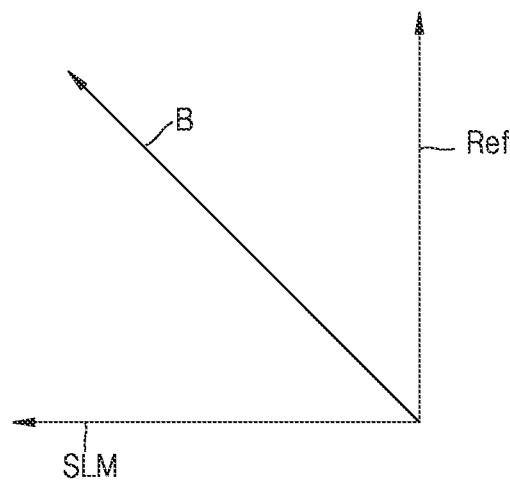
FIG. 8 shows an example of a polarization direction of combined light when a phase of target light emitted from a phase modulator is opposite to a phase of reference light.

A polarization direction of a combined light, which is a combination of the target light and the reference light, may be determined according to the phase of the target light and the phase of the reference light. For example, FIG. 7 shows an example of a polarization direction of the combined light when the phase of the target light (show as "SLM" in the figure) emitted from the second phase modulator 130 and the phase of the reference light (shown as "Ref" in the figure) are identical to each other, and FIG. 8 shows an example of a polarization direction of the combined light when the phase of the target light (shown as "SLM" in the figure) emitted from the second phase modulator 130 and the phase of the reference light (shown as "Ref" in the figure) are opposite to each other. Assuming that the reference light has a polarization component in a vertical direction, the target light has a polarization component in a horizontal direction, and 12 o'clock direction is 0 degree, when the phase of the target light and the phase of the reference light are precisely identical to each other, the combined light, which is the combination of the target light and the reference light, has a direction of +45 degrees as it is marked with "A" in FIG. 7. When the phase of the target light and the phase of the reference light are precisely opposite to each other, the combined light, which is the combination of the target light and the reference light, has a direction of −45 degrees as it is marked with "B" in FIG. 8.

Accordingly, if the first polarizer 169a transmits light having a polarization direction tilted by −45 degrees with reference to the polarization direction of the reference light and the second polarizer 169b transmits light having a polarization direction tilted by +45 degrees with respect to the polarization direction of the reference light, the combined light is only transmitted through the second polarizer 169b without being transmitted through the first polarizer 169a when the phase of the target light and the phase of the reference light are precisely identical to each other. When the phase of the target light and the phase of the reference light are precisely opposite to each other, the combined light is only transmitted through the first polarizer 169a without penetrating the second polarizer 169b.

Figure 9:
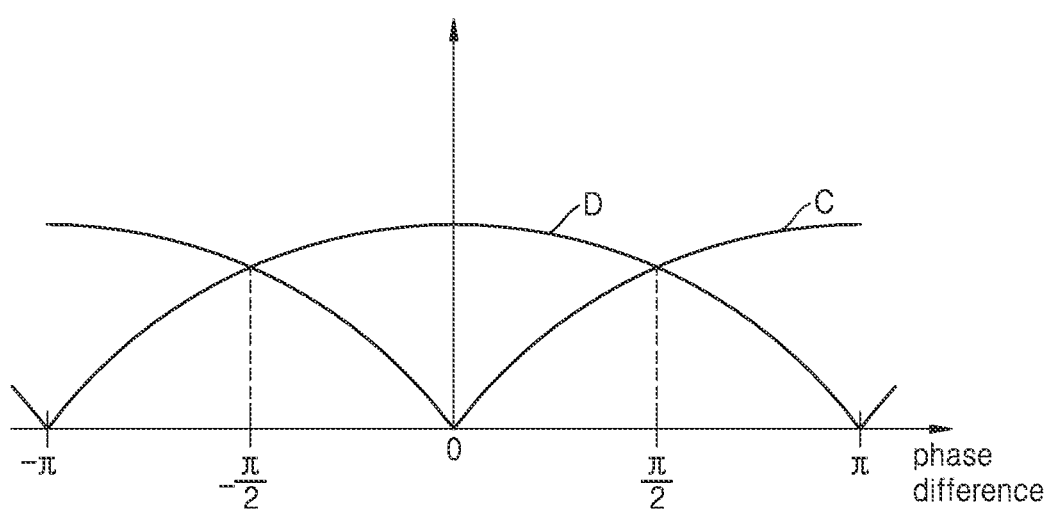
FIG. 9 is a graph showing an example of intensities of combined light transmitted through two different polarizers according to a phase difference between target light emitted from a phase modulator and reference light.

While a phase difference between the reference light and the target light changes from 0 degree to 180 degrees, an intensity of the combined light being transmitted through the first polarizer 169a gradually increases, and the intensity of the combined light being transmitted through the second polarizer 169b gradually decreases. For example, FIG. 9 is a graph showing examples of the intensity of the combined light transmitted through the first polarizer 169a and the second polarizer 169b according to the phase difference between the target light and the reference light emitted from the second phase modulator 130. In FIG. 9, a horizontal axis indicates the phase difference between the target light and the reference light, a graph marked with "C" indicates a change in the intensity of the combined light being transmitted through the first polarizer 169a according to the phase difference, and a graph marked with "D" indicates a change in the intensity of the combined light transmitted through the second polarizer 169b according to the phase difference. Accordingly, the phase difference between the reference light and the target light may be determined by comparing the intensity of the combined light transmitted through the first polarizer 169a and the combined light transmitted through the second polarizer 169b.

To this end, the image sensor layer 162b may include a plurality of light-sensing pixels that are two-dimensionally arranged. For example, the plurality of light-sensing pixels may include a first light-sensing pixel 169c for sensing the intensity of the combined light transmitted through the first polarizer 169a and a second light-sensing pixel 169d for sensing the intensity of the combined light transmitted through the second polarizer 169b. The first light-sensing pixel 169c and the second light-sensing pixel 169d may be positioned adjacent to each other as shown in FIG. 6 and may correspond to one pixel of the second phase modulator 130. Therefore, a resolution of the image sensor layer 162b may be twice the resolution of the second phase modulator 130. For example, when the second phase modulator 130 has the resolution of 200×100, the image sensor layer 162b may have a resolution of 200×200 or 400×100.

The comparison layer 162c may include a plurality of comparators 169e for comparing an output of the first light-sensing pixel 169c to an output of the second light-sensing pixel 169d. The comparison layer 162c may have a resolution identical to a resolution of the second phase modulator 130. In other words, the plurality of comparators 169e each having the resolution identical to that of the second phase modulator 130 may be two-dimensionally arranged in the comparison layer 162c. Therefore, there may be a one-to-one correspondence among the plurality of comparators 169e in the comparison layer 162c, the plurality of pixels in the second phase modulator 130, the plurality of polarizing pixels in the polarizer layer 162, and the plurality of pixels in the optical shutter 164. Each of the comparators 169e may, for example, be connected to the output of the second light-sensing pixel 169d and the output of the first light-sensing pixel 169c and calculate a difference between the output of the second light-sensing pixel 169d and the output of the first light-sensing pixel 169c.

The controller 163 may control each pixel in the optical shutter 164 based on the output of each comparator 169e of the comparison layer 162c. The controller 163 may include software, an electronic circuit, or a dedicated semiconductor chip. For example, when the output of the second light-sensing pixel 169d is equal to or greater than the output of the first light-sensing pixel 169c, that is, when the output of the comparator 169e is equal to or greater than 0, the controller 163 turns on a pixel of the optical shutter 164 corresponding to the comparator 169e. By doing so, light emitted from a pixel of the second phase modulator 130 corresponding to the comparator 169e may be transmitted through the optical shutter 164. In addition, when the output of the second light-sensing pixel 169d is less than the output of the first light-sensing pixel 169c, for example, when an output of the comparator 169e is less than 0, the controller 163 turns off a pixel of the optical shutter 164 corresponding to the comparator 169e. By doing so, light emitted from a pixel of the second phase modulator 130 corresponding to the comparator 169e is blocked by the optical shutter 164.

In this case, when a phase difference between the target light emitted from any one pixel in the second phase modulator 130 and the reference light is within a range from about −90 degrees to about +90 degrees, the light emitted from the pixel of the second phase modulator 130 is entirely and directly transmitted through the optical shutter 164. When a phase difference between the target light emitted from any one pixel of the second phase modulator 130 and the reference light is out of the range from about −90 degrees to about +90 degrees, the light emitted from the pixel of the second phase modulator 130 is entirely blocked by the optical shutter 164. However, the present embodiment is merely an example, and a range of a phase difference that is a reference may be differently selected. For example, a reference value set by the controller 163 may be a value other than 0 with respect to a difference between an output of the second light-sensing pixel 169d and an output of the first light-sensing pixel 169c. In this case, a range of a phase difference that is a reference for turning on/off the optical shutter 164 may also be changed.

Figure 10:
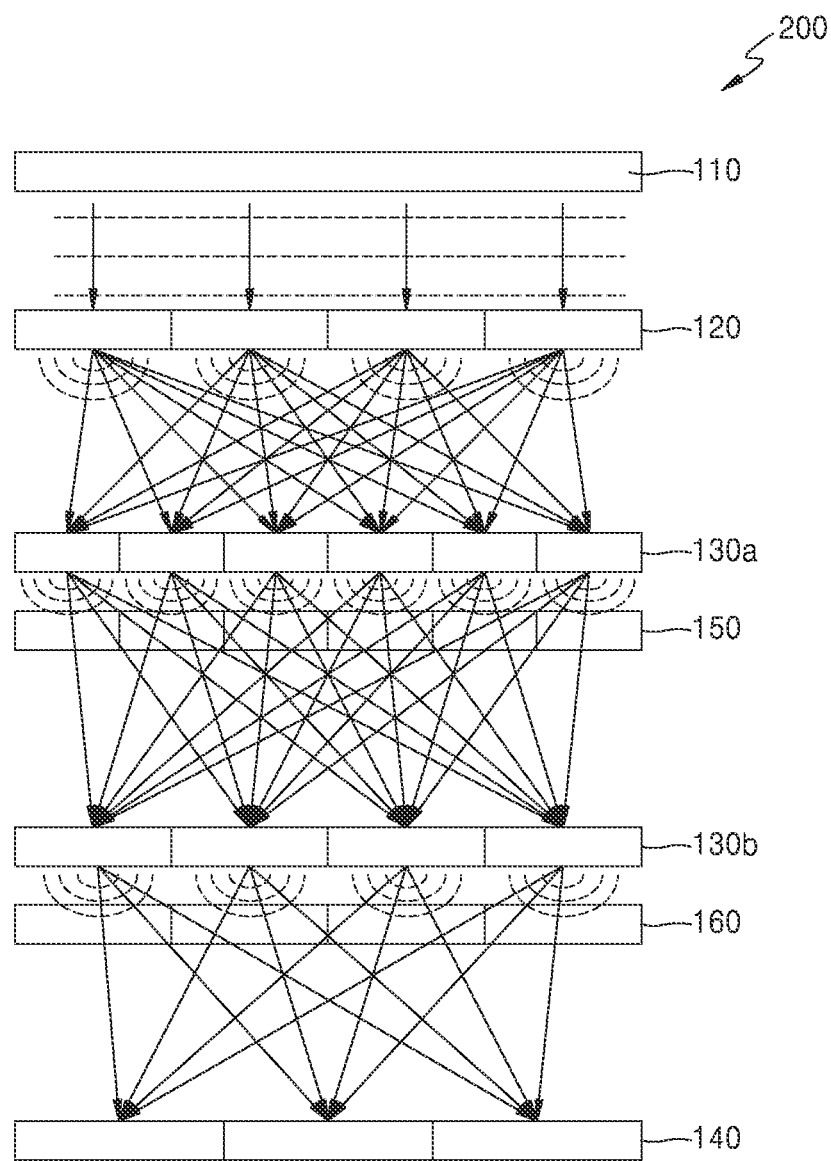
FIG. 10 is a conceptual diagram showing a schematic configuration of an optical neural network apparatus, according to an embodiment.

In FIG. 1, the optical neural network apparatus 100 is described as having only one second phase modulator 130 as the hidden layer. However, the number of hidden layer may be equal to or greater than 2. For example, FIG. 10 is a conceptual diagram showing a schematic configuration of an optical neural network apparatus 200 according to an embodiment. Referring to FIG. 10, the optical neural network apparatus 200 may include the first phase modulator 120 as an input layer and include a second phase modulator 130a and a third phase modulator 130b as hidden layers. Although not shown in FIG. 10, the optical neural network apparatus 200 may have at least three phase modulators as hidden layers. The first phase modulator 120, the second phase modulator 130a, and the third phase modulator 130b may have identical resolutions, but the present disclosure is not limited thereto and the first phase modulator 120, the second phase modulator 130a, and the third phase modulator 130b may respectively have different resolutions. Resolutions of the first phase modulator 120, the second phase modulator 130a, and the third phase modulator 130b may be properly selected according to target tasks.

In addition, as shown in FIG. 10, the optical neural network apparatus 200 may further include the optical devices 150 and 160 for providing the activation function to the second phase modulator 130a and the third phase modulator 130b, respectively. The optical device 150 may be disposed to face a light-emitting surface of the second phase modulator 130a and partially transmit or block light emitted from each pixel of the second phase modulator 130, according to an intensity of the light. In this case, the resolution of the image sensor 152 and the resolution of the optical shutter 154 in the optical device 150 may be identical to the resolution of the second phase modulator 130a.

The optical device 160 may be disposed to face a light-emitting surface of the third phase modulator 130b. The optical device 160 may partially transmit or block light emitted from each pixel of the third phase modulator 130b according to a phase of the light. In this case, the resolution of the comparison layer 162c and the resolution of the optical shutter 164 in the optical device 160 may be identical to the resolution of the third phase modulator 130b, and a resolution of the image sensor layer 162b in the optical device 160 may be twice the resolution of the third phase modulator 130b.

In the example shown in FIG. 10, types and positions of the optical devices 150 and 160 are used in a descriptive sense only, and the optical devices 150 and 160 are properly selected and disposed as needed. For example, the optical device 150 based on a light intensity may be disposed for both the second phase modulator 130a and the third phase modulator 130b. Alternatively, the optical device 160 based on a phase may be disposed for both the second phase modulator 130a and the third phase modulator 130b. Alternatively, the optical device 160 based on the phase may be disposed for the second phase modulator 130a and the optical device 150 based on the light intensity may be disposed for the third phase modulator 130b.

The above-mentioned optical devices 150 and 160 may be positioned between two phase modulators of the optical neural network apparatus or between the phase modulator and the image sensor, apply an activation function to light emitted from a phase modulator in front of the optical device and provide the light to a phase modulator behind the optical device or to the image sensor. Therefore, the activation function facility may be provided to the optical neural network apparatus 200 through the optical devices 150 and 160, and thus, the performance of the optical neural network apparatus 200 may be further enhanced.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in forms and details may be made therein without departing from the spirit and the scope as defined by the following claims.

What is claimed is:

1. An optical device comprising:
    a beam splitter configured to split an incident light into a first light and a second light;
    an image sensor positioned to sense the first light;
    an optical shutter configured to transmit or block the second light; and
    a controller configured to control the optical shutter such that the optical shutter transmits or blocks the second light, by comparing an intensity of the first light measured by the image sensor with a reference value.

2. The optical device of claim 1, wherein the first light is reflected by the beam splitter and the second light is transmitted by the beam splitter.

3. The optical device of claim 1, wherein the image sensor comprises a plurality of light-sensing pixels that are two-dimensionally arranged,
    wherein the optical shutter comprises a plurality of pixels that are two-dimensionally arranged, and
    wherein a resolution of the image sensor is identical to a resolution of the optical shutter such that there is a one-to-one correspondence between the plurality of light-sensing pixels of the image sensor and the plurality of pixels of the optical shutter.

4. The optical device of claim 3, wherein the controller is configured to:
    when an output of a light-sensing pixel from among the plurality of light-sensing pixels of the image sensor is less than a reference value, turn off a pixel from among the plurality of pixels of the optical shutter corresponding to the light-sensing pixel of the image sensor; and
    when the output of the light-sensing pixel from among the plurality of light-sensing pixels of the image sensor is equal to or greater than a reference value, turn on the pixel of the optical shutter corresponding to the light-sensing pixel of the image sensor.

5. The optical device of claim 1, wherein the controller is configured to block the second light by turning off the optical shutter when the intensity of the first light incident on the image sensor is less than the reference value and transmit the second light by turning on the optical shutter when the intensity of the first light incident on the image sensor is equal to or greater than the reference value.

6. The optical device of claim 1, wherein the optical shutter comprises a bistable liquid crystal.

7. An optical device comprising:
    a beam splitter configured to split an incident light into a first light and a second light;
    a reference light source configured to emit a reference light;
    a phase comparator configured to compare a phase of the reference light to a phase of the first light;
    an optical shutter configured to transmit or block the second light; and
    a controller configured to control the optical shutter based on a result of comparing the phase of the reference light to the phase of the first light performed by the phase comparator.

8. The optical device of claim 7, wherein the reference light source comprises a laser configured to emit coherent light that has a wavelength identical to a wavelength of the incident light.

9. The optical device of claim 7, wherein the phase comparator is positioned facing a reflecting surface of the beam splitter, the optical shutter is positioned facing a transmission surface of the beam splitter, and the reference light source is positioned facing the phase comparator with the beam splitter positioned between the phase comparator and the reference light source.

10. The optical device of claim 7, wherein the incident light is linearly polarized in a first direction and the reference light is linearly polarized in a second direction orthogonal to the first direction.

11. The optical device of claim 10, wherein the phase comparator comprises:
    a polarization beam combiner configured to combine the reference light with the first light and guide the combined light;
    a polarizer layer comprising a first polarizer configured to transmit light that has a polarization direction tilted by −45 degrees with respect to the second direction and a second polarizer configured to transmit light that has a polarization direction tilted by +45 degrees with respect to the second direction;
    an image sensor layer comprising:
        a first light-sensing pixel configured to sense an intensity of the light transmitted through the first polarizer; and
        a second light-sensing pixel configured to sense an intensity of the light transmitted through the second polarizer; and
    a comparison layer comprising a comparator configured to compare an output of the first light-sensing pixel to an output of the second light-sensing pixel.

12. The optical device of claim 11, wherein the optical shutter comprises a plurality of pixels that are two-dimensionally arranged,
    wherein the polarizer layer comprises a plurality of polarizing pixels that are two-dimensionally arranged, the plurality of polarizing pixels each comprising the first polarizer and the second polarizer,
    wherein the comparison layer comprises a plurality of comparators that are two-dimensionally arranged, and
    wherein a resolution of the polarizer layer, a resolution of the comparison layer, and a resolution of the optical shutter are identical to one another such that there is a one-to-one correspondence among the plurality of polarizing pixels of the polarizer layer, the plurality of comparators of the comparison layer, and the plurality of pixels of the optical shutter.

13. The optical device of claim 12, wherein the image sensor layer comprises a plurality of the first light-sensing pixels that are two-dimensionally arranged and a plurality of the second light-sensing pixels that are two-dimensionally arranged, and wherein a resolution of the image sensor layer is twice the resolution of the optical shutter.

14. The optical device of claim 12, wherein the controller is configured to:

when the output of the second light-sensing pixel is equal to or greater than the output of the first light-sensing pixel, turn on a pixel from among the plurality of pixels of the optical shutter corresponding to the comparator of the comparison layer; and when the output of the second light-sensing pixel is less than the output of the first light-sensing pixel, turn off the pixel from among the plurality of pixels of the optical shutter corresponding to the comparator of the comparison layer.

15. The optical device of claim 7, wherein the controller is configured to:

transmit the second light by turning on the optical shutter when a phase difference between the reference light and the first light is within a range from −90 degrees to +90 degrees; and block the second light by turning off the optical shutter when the phase difference between the reference light and the first light is outside of the range from −90 degrees to +90 degrees.

16. The optical device of claim 7, wherein the optical shutter comprises a bistable liquid crystal.

* * * * *